United States Patent
Chen

(10) Patent No.: US 9,891,952 B1
(45) Date of Patent: *Feb. 13, 2018

(54) LAZY PERSISTENT STORAGE VOLUME PROVISIONING

(71) Applicant: Red Hat, Inc., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,932

(22) Filed: May 12, 2017

Related U.S. Application Data

(63) Continuation of application No. 15/340,621, filed on Nov. 1, 2016, now Pat. No. 9,678,683.

(51) Int. Cl.
G06F 12/00 (2006.01)
G06F 9/50 (2006.01)
G06F 3/06 (2006.01)

(52) U.S. Cl.
CPC ............ *G06F 9/50* (2013.01); *G06F 3/0604* (2013.01); *G06F 3/0631* (2013.01); *G06F 3/0644* (2013.01); *G06F 3/0683* (2013.01)

(58) Field of Classification Search
None
See application file for complete search history.

(56) References Cited

U.S. PATENT DOCUMENTS

| | | |
|---|---|---|
| 7,467,276 B1 | 12/2008 | Kahn et al. |
| 7,577,692 B1 | 8/2009 | Corbett et al. |
| 7,945,724 B1 | 5/2011 | Smith et al. |
| 8,266,191 B1 | 9/2012 | Aggarwal et al. |
| 8,601,473 B1 | 12/2013 | Aron et al. |
| 8,892,507 B1 | 11/2014 | Dwyer, III et al. |
| 9,323,465 B2 | 4/2016 | Flynn et al. |
| 9,436,399 B2 | 9/2016 | Garson et al. |
| 2007/0233868 A1 | 10/2007 | Tyrrell et al. |
| 2012/0173728 A1 | 7/2012 | Haskins et al. |
| 2014/0025872 A1 | 1/2014 | Flynn et al. |
| 2016/0011811 A1 | 1/2016 | Garson et al. |
| 2016/0110121 A1 | 4/2016 | Singh et al. |
| 2016/0127200 A1 | 5/2016 | Dippenaar et al. |
| 2016/0154834 A1 | 6/2016 | Friedman |

OTHER PUBLICATIONS

Using Nutanix Container Reservations and a FreeSpace Container for Availability and Capacity Planning by Michael Webster, Mar. 9, 2014 in Nutanix; pp. 1-5.

(Continued)

*Primary Examiner* — John A Lane
(74) *Attorney, Agent, or Firm* — K&L Gates LLP

(57) ABSTRACT

Methods and systems for provisioning persistent storage are disclosed. For example, a new isolated guest and associated persistent storage volume are requested to be created. The isolated guest is based on an image file in an image repository and is associated with metadata. An orchestrator obtains the image file. The orchestrator reserves the persistent storage volume by updating the system resource allocation database based on the metadata. The persistent storage volume is then created in the persistent storage based on the reservation of the persistent storage volume in the system resource allocation database. The orchestrator activates the constructed isolated guest and the isolated guest accesses the persistent storage volume.

20 Claims, 6 Drawing Sheets

(56) References Cited

OTHER PUBLICATIONS

StorageOS—Fast Persistent Storage for Docker Containers, Business & Technology, Jul. 1, 2016, Symantec, Together Our Solutions are Stronger.
Amazon Elastic Block Store (Amazon EBS), Amazon Elastic Compute Cloud, http://docs.aws.amazon.com/AWSEC2/latestUserGuide/AmazonEBS.html, pp. 1-3.
Chapter 6. Get Started Provisioning Storage in Kubernetes—Red Hat Customer Portal, Red Hat Training pp. 1-11.
Stewart et al., NetApp Storage Best Practices for VMware vSphere, NetApp, Dec. 2011/TR-3749/Version 3.0.
Thin Provisioning—What's the scoop? VMware VSphere Blog by Cormac Hogan, dated Mar. 2, 2012, pp. 1-24.
Virtual Provisioning for the EMC VNX2 SEries, VNX5200, VNX5400, VNX5600, VNX5800, VNX5800, VNX7600, & VNX8000, Applied Technology, Mar. 2016.
EMC launches thin-provisioning solution, ZDNet by Colin Barker, Jan. 15, 2008.
Raid-zero.com Thoughts on Thin Provisioning by J. Cason, May 28, 2014.

LAZY PERSISTENT STORAGE VOLUME PROVISIONING

CROSS-REFERENCE TO RELATED APPLICATIONS

The present application is a continuation application of U.S. application Ser. No. 15/340,621, filed Nov. 1, 2016, the entire contents of which is hereby incorporated by reference herein.

BACKGROUND

The present disclosure generally relates to improving the launching of containers. Typically, containers generally require persistent storage volumes to function. Provisioning persistent storage volume may involve an orchestrator first requesting a persistent storage volume to be created by a persistent storage. The orchestrator may then wait for verification that the persistent storage volume has been created as a prerequisite to creating an isolated guest from an image file. Upon verification that the persistent storage volume has been created, the orchestrator may then continue with creating the isolated guest. After the isolated guest is created, the isolated guest may perform various tasks requested by a user.

SUMMARY

The present disclosure provides a new and innovative system, methods and apparatus for provisioning persistent storage. In an example, the system includes an image repository, a persistent storage, a system resource allocation database, and an orchestrator running on one or more processors. The orchestrator in turn includes an input/output module and an orchestrator engine. The input/output module receives a request to create an isolated guest and a persistent storage volume associated with the isolated guest. The isolated guest is created from an image file which is associated with metadata. The orchestrator obtains the image file and metadata from the image repository. The orchestrator then reserves the persistent storage volume by updating the system resource allocation database based on the metadata. The persistent storage volume is then created in the persistent storage based on the reservation of the persistent storage volume in the system resource allocation database. The orchestrator activates the constructed isolated guest and the isolated guest accesses the persistent storage volume.

Additional features and advantages of the disclosed method and apparatus are described in, and will be apparent from, the following Detailed Description and the Figures.

DETAILED DESCRIPTION OF EXAMPLE EMBODIMENTS

Figure 1:
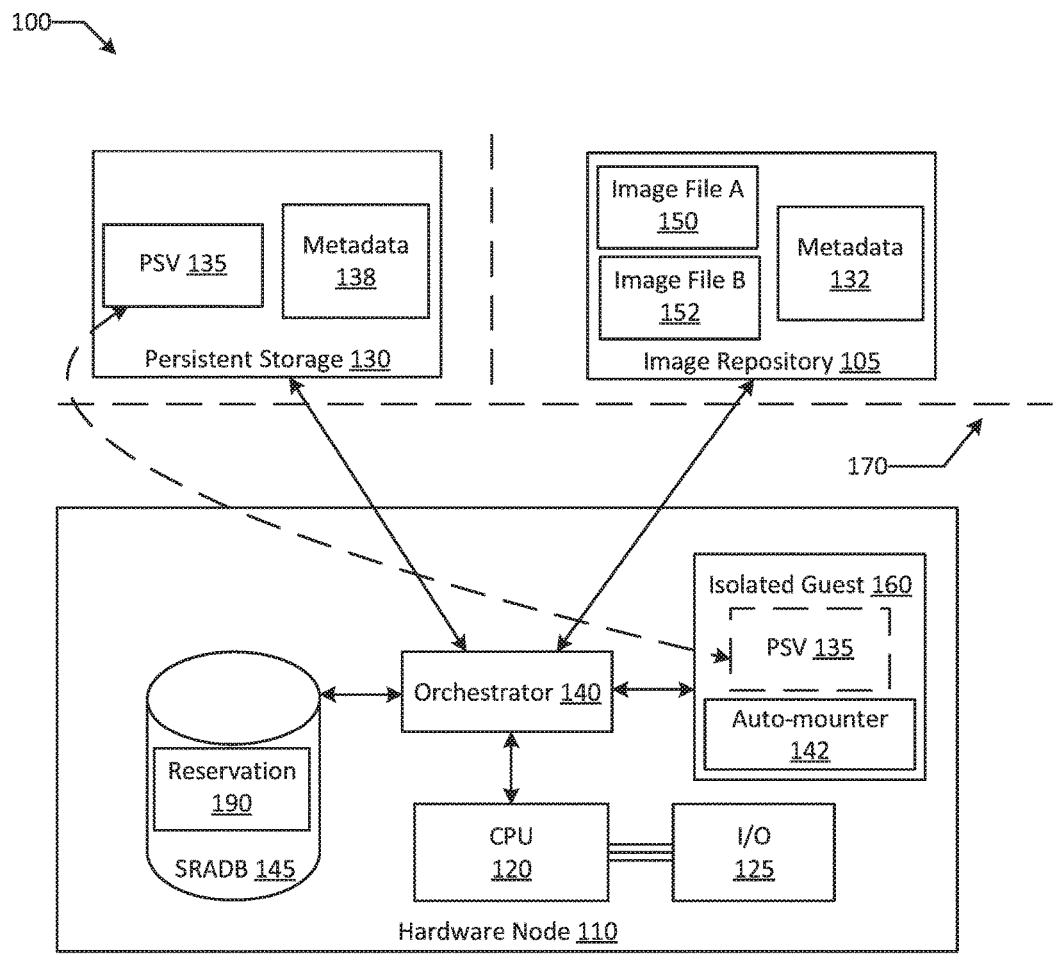
FIG. 1 is a block diagram of an example system illustrating provisioning a persistent storage volume according to an example of the present disclosure.

In computer systems, isolated guests can be used for creating hosting environments for running application programs. A computer system may use a container based virtualization system such as Red Hat® OpenShift® or Docker®, or a system where stand alone virtualized operating systems are created including the use of a hypervisor. The runtime environment necessary for the running of desired application code can be loaded onto the computer system in the form of isolated guest, for example, a Docker® container or a virtual machine. To operate, these isolated guests need to have system resources allocated to them, including, for example, persistent storage volumes for the non-transitory storage of data, the persistent storage volumes needing to perform to required specifications in terms of attributes such as size and I/O rate. In large scale implementations, container schedulers, for example container orchestrators such as Kubernetes® or Docker Swarm®, generally respond to frequent container startups and cleanups with low latency. System resources are generally allocated before isolated guests start up and released for re-use after isolated guests exit.

The availability and allocation of system resources may be managed by a system resource allocation database, as is typically the case in, for example, a Docker® implementation. Each type of system resource may be tracked by entries in a database, for example, in a database table. In some implementations, a table in the system resource allocation database may contain records of the attributes of the persistent storage volumes associated with numerous isolated guests managed by one or more orchestrators. In some examples, an orchestrator will first request that a persistent storage volume be provisioned by a persistent storage. As part of a request for a persistent storage volume to be created, a persistent storage may first determine if the persistent storage has sufficient capacity to allocate the new persistent storage volume. In an example, the persistent storage may then grant the request for creating a new persistent storage volume by, for example, binding the persistent storage volume with a volume claim associated with the new isolated guest, allocating the persistent storage volume to the new isolated guest. In an example, the persistent storage may then physically create the persistent storage volume, including, in an example, formatting the persistent storage volume for use by the isolated guest. In an example, the persistent storage may respond to the request for creating a persistent storage volume only after successfully creating the requested persistent storage volume. The persistent storage volume would then be ready to be mounted by the isolated guest once the isolated guest is successfully created. In some examples, the persistent storage volume may need to be mounted to the isolated guest before the isolated guest may access the persistent storage volume to store or retrieve data. In other examples, a persistent storage volume may be accessed without being mounted.

Claiming a persistent storage volume using a system resource allocation database may be a high latency task. A system resource allocation database (e.g., a persistent volume database) needs to first be queried for a block of storage that may meet the performance and size criteria of the persistent storage volume request. Then, a reservation is placed on the volume by updating the database. The querying and updating of the system resource allocation database may also take several minutes to finish.

Creating a persistent storage volume is also a high latency task in many examples of high performance persistent storage equipment. For example, to provision a file share from GlusterFS®, a logical volume management (LVM) volume is first created on multiple GlusterFS® clients managing multiple physical disks. After the LVM is created, a Gluster® volume is then created with a specified protection policy, an access control policy is then set up for the volume before the persistent storage volume may be started. The whole process on a busy system may typically take many minutes to finish.

Finally, mounting a newly created persistent storage volume also takes time and adds latency. In many examples, once a persistent storage volume is allocated to the isolated guest, the persistent storage volume may need to be physically created including in an example, having multiple physical storage volumes bound into a logical persistent storage volume. The persistent storage volume may then be mounted to an isolated guest. In order to be successfully mounted, the persistent storage volume may be required to be formatted in a recognizable format for the isolated guest. Formatting may also take several minutes.

The combined result of waiting for the provisioning process, possibly including the claiming, allocating, creating, mounting and formatting of the persistent storage volume to finish significantly delays the launch of isolated guests, and may often times defeat the purpose of deploying isolated guests as lightweight microservices. In many examples, this form of delay is most impactful when systems are busiest, which is precisely when more isolated guests may be needed to share the compute load on the system.

The present disclosure aims to address the latency problem in provisioning persistent storage volumes for isolated guests by lazily provisioning persistent storage volumes based on a metadata reservation and time-to-live timestamp in place of a system where an orchestrator waits for an actual confirmation of successful persistent storage volume provisioning. Creating an isolated guest from an image file entails several high latency tasks aside from provisioning persistent storage volumes, including loading the image file from an image repository, and provisioning (including allocating and mounting) storage for the operational files of the isolated guest such as operating system files. In an example, there may be significant gains in isolated guest creation time where high latency tasks may be initiated simultaneously. The orchestrater uses metadata operations in place of physical operations to receive acknowledgements to proceed in isolated guest creation. For example, the orchestrator relies on metadata associated with an image file to make a reservation for a persistent storage volume with the necessary size and performance attributes for the isolated guest rather than waiting for the persistent storage volume to be ready for use. By allowing an orchestrator to have a trustworthy expectation of having a persistent storage volume provisioned and ready for an isolated guest by the time the isolated guest requires the persistent storage volume through use of a light weight metadata based reservation system, the orchestrator may receive confirmation to proceed with other tasks required for the creation of an isolated guest much sooner than if the orchestrator waits for a confirmation that a persistent storage volume has been successfully provisioned. The time spent on provisioning the persistent storage volume therefore is concealed in the construction time for the isolated guest resulting in a large perceived speed increase for the start up of the isolated guest.

Thus, the presently disclosed orchestrator provides significant advantages over existing container image construction and persistent volume allocation technology, including but not limited to: greatly enhancing the speed and reducing the latency of container creation, optimization of storage space needs, optimization of storage performance needs, higher processor usage, reduced footprint for the same processing power, reduced power consumption, faster release and deployment, and reduced maintenance overhead.

FIG. 1 depicts a block diagram of an example system 100 illustrating provisioning a persistent storage volume ("PSV") according to an example of the present disclosure. In an example, hardware node 110 may host one or more physical processors (e.g., CPU 120) communicatively coupled with an input/output (I/O) device 125. As used herein, physical processor or processor (120) refers to a device capable of executing instructions encoding arithmetic, logical, and/or I/O operations. As discussed herein, I/O device 125 refers to a device capable of providing an interface between one or more processor pins and an external device capable of inputting and/or outputting binary data. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors 120 may be interconnected using a variety of techniques, ranging from a point-to-point processor interconnect, to a system area network, such as an Ethernet-based network. In an example, orchestrator 140 may operate as a component of the hardware node 110 such as an executable program performing the functions of the orchestrator 140 in the present disclosure. For example, an executable program of the orchestrator 140 may be in a number of languages including ARM® architecture assembly, Atmel AVR assembly, x86 assembly, Freescale 68HC11 assembly, Freescale v4e assembly, Motorola 680x0 assembly, MIPS assembly, PowerPC® assembly, IBM® System z assembly, TI® MSP430 assembly, Zilog Z80 assembly, and machine code. Orchestrator 140 may run on processors 120. Local connections within the orchestrator 140 including, for example, the connections between processor 120 and I/O 125 may be provided by one or more local buses of suitable architecture, for example, peripheral component interconnect (PCI). In an example, the orchestrator 140 may be a container orchestrator such as Kubernetes® or Docker Swarm®.

The system resource allocation database ("SRADB") 145 may be any suitable type of database running on the memory device 130, for example, a relational database. The system resource allocation database 145 may reside on any suitable type of memory device associated with the hardware node 110. Such a memory device may be a volatile or non-volatile memory device, such as RAM, hard disk, block device, or any other device capable of storing data. The system resource allocation database 145 may be associated with a database management system (DBMS). A DBMS is a software application that facilitates interaction between the database and other components of the hardware node 110. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, the system resource allocation database 145 may be organized as a formal database with a schema such as a relational schema with defined tables, indices, links, triggers, various commands etc. In some examples, the system resource allocation database 145 may not be organized as a formal database, but may instead be an alternative storage structure capable of holding the information needed to provide a real-time status of shared system resources for the hardware node 110, including but not limited to a file, folder, directory, registry, etc. In some examples, the system resource allocation database 145 may reside over a network (not depicted), which may be, for example, a public network (e.g., the Internet), a private network (e.g., a local area network (LAN) or wide area network (WAN)), or a combination thereof.

In an example, hardware node 110 may additionally host numerous isolated guests, including but not limited to containers and virtual machines. For example, isolated guest 160 may be a container or a virtual machine. In an example, a container may be any form of operating system level virtualization, for example, Red Hat® OpenShift®, Docker® containers, chroot, Linux®-VServer, Solaris® Containers (Zones), FreeBSD® Jails, HP-UX® Containers (SRP), VMware ThinApp®, etc. Containers may also run directly on hardware node 110 or run within another layer of virtualization, for example, in a virtual machine. Isolated guest 160 may also be a virtual machine, which may in turn utilize a hypervisor either as a software component running on a host operating system or directly on the hardware node 110 without an operating system to provide virtual machines with virtualized processors, memory, I/O devices. Virtual machines may utilize any virtualization technology, including but not limited to Red Hat® Virtualization Manager™, Linux®-VServer™, Windows® Virtual PC™, various virtualization solutions available from ORACLE® CORPORATION and VMware®, etc. In an example, isolated guest 160 may be one of many possible containers and or virtual machines constructed and stored within hardware node 110.

In an example, orchestrator 140 may be in communication with an image repository 105, which may be an image repository found in containerization products such as Docker® DockerHub®, Pivotal® Cloud Foundry, IBM® BlueMix®, Amazon® Amazon Web Services® (AWS®), Google® Google Cloud Platform™, or Microsoft® Azure®. The image repository 105 may contain many possible image files (e.g., image files 150 and 152) used in the construction of isolated guests, and metadata 132 including information regarding requirements for persistent storage volumes to be associated with isolated guests created from image files 150 and 152. In an example, orchestrator 140 may create isolated guest 160 from image file 150, and reserve a persistent storage volume for isolated guest 160 in the system resource allocation database 145 with reservation 190 based on metadata 132. In an example, orchestrator 140 may create isolated guest 160 with an auto-mounter plugin 142 which may utilize the data in the system resource allocation database 145, including for example, reservation 190, to mount a persistent storage volume 135 to isolated guest 160 once the persistent storage volume 135 is created. In an example, persistent storage volume 135 may be hosted on persistent storage 130, and persistent storage 130 may include metadata 138 with information regarding how the storage within persistent storage 130 is allocated.

In an example, network 170 may separate the hardware node 110 from image repository 105 and persistent storage 130. In another example, the system resource allocation database 145, isolated guest 160 and the orchestrator 140 may also be separated from the hardware node 110 via network 170. For example, the network 170 may be a public network (e.g., the Internet), a private network (e.g., a local area network (LAN) or wide area network (WAN)), or a combination thereof.

In an example, metadata 132 and metadata 138 may be associated with the image repository 105 and the persistent storage 130 respectively via any suitable approach. For example, metadata 132 may be stored as part of image files 150 and 152 that includes the content (e.g., metadata 132 forms a header in a file). Metadata 138 may also be a part of persistent storage volumes in persistent storage 130, for example as part of persistent storage volume 135. As another example, metadata 132 and metadata 138 may be stored in a separate location from the content. In particular, metadata 132 and metadata 138 may be stored in metadata files (e.g., one file for each instance of content), a database (e.g., metadata database within an electronic device or within a particular application), remote location (e.g., a remote server), or any other suitable location. If metadata 132 and metadata 138 are stored separately from the content, metadata 132 and metadata 138 may be associated with the content using any suitable approach, including for example one or more references in metadata 132 and metadata 138 and/or content, pointers, links, or other combinations of these. Metadata 132 and metadata 138 may include any suitable type of metadata.

Figure 2:
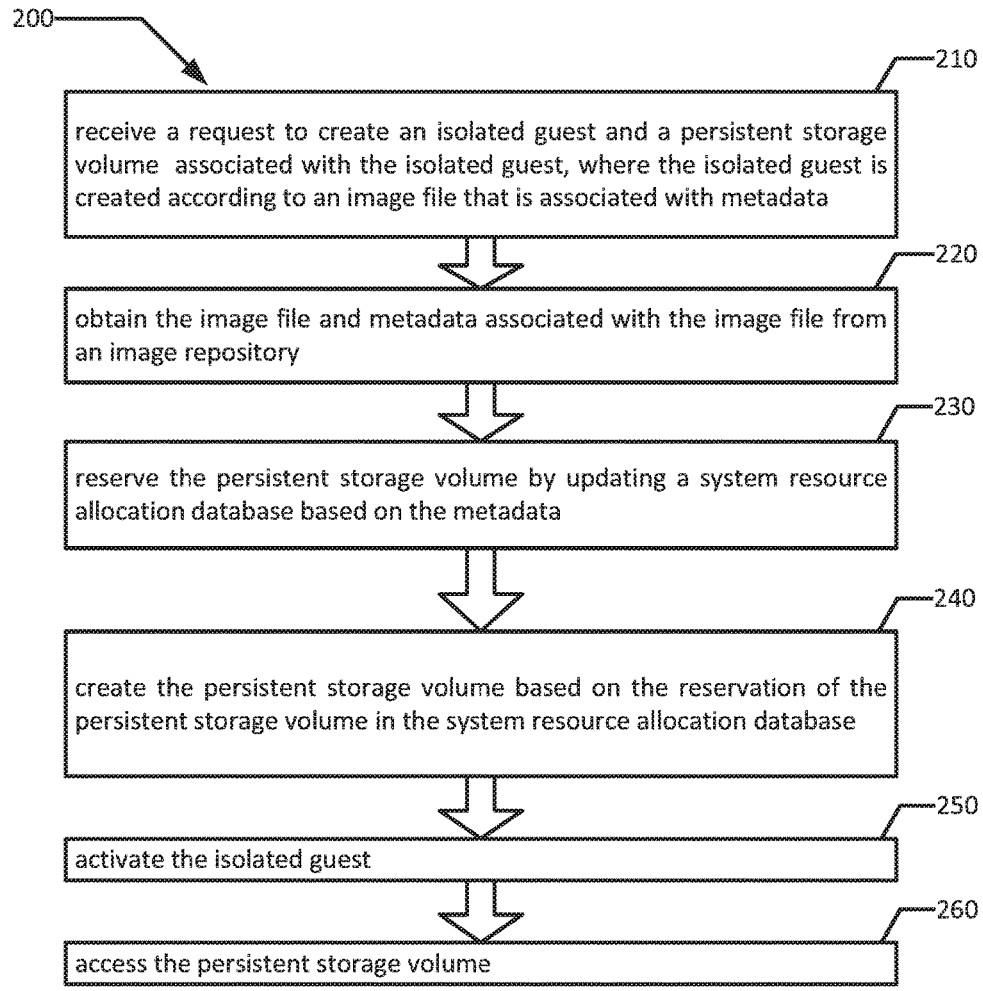
FIG. 2 is a flowchart illustrating an example of the provisioning of a persistent storage volume according to an example of the present disclosure.

FIG. 2 is a flowchart illustrating an example of the provisioning of a persistent storage volume according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the method is performed by an orchestrator 140.

In an example, a request is received to create a new isolated guest and a persistent storage volume associated with the isolated guest, where the isolated guest is created according to an image file, and the image file is associated with metadata (block 210). In illustrated example 100, the orchestrator 140 may receive a request to create isolated guest 160 based on image file 150. In the example, image file 150 is associated with metadata 132, which may be related to image file 150 in a one to one relationship either as part of image file 150 or in a directly associated metadata file. In another example, metadata 132 may be a shared metadata for multiple image files or even all of the image files in image repository 105. In an example, metadata 132 may include, among other possible data, information regarding the requirements for size and performance characteristics of an isolated guest (e.g., a container or virtual machine)

constructed from image file 150. In the illustrated example 100, metadata 132 includes size and performance characteristics for persistent storage volume 135 associated with isolated guest 160. In an example, metadata 132 may include an additional minimum size and minimum performance characteristics for isolated guest 160. Performance characteristics may include, for example, input/output speed of the persistent storage volume, buffer sizes for the persistent storage volume, seek time, latency, power consumption, and redundancy/disaster mitigation. In an example, image repository 105 may be separated from the orchestrator 140 and hardware node 110 by a network.

An image file is obtained along with metadata associated with the image file from the image repository (block 220). In illustrated example 100, the orchestrator 140 may retrieve a copy of all or part of image file 150 from the image repository 105 to use in the construction of isolated guest 160. The orchestrator 140 may also retrieve metadata 132, either separately or in conjunction with the retrieval of image file 150, for use in reserving persistent storage volume 135 for the completed isolated guest 160. In an example, metadata 132 may be retrieved before image file 150, or the retrieval of metadata 132 may complete before the retrieval of image file 150. In an example, retrieving metadata 132 separately from image file 150 may be advantageous due to metadata 132 having a smaller size and/or faster retrieval time.

A persistent storage volume for the isolated guest is reserved by updating a system resource allocation database based on the metadata (block 230). In an example, system resource allocation database 145 may be a general system resource allocation database including allocation information for many types of shared compute resources utilized by isolated guests, for example, isolated guests hosted by hardware node 110. System resource allocation database 145 may be stored on hardware node 110, or separately in its own location, possibly over a network 170. In an example, system resource allocation database 145 may also be a specialized database, for example, a persistent storage database, and may be stored on hardware node 110, persistent storage 130, or separately over a network 170. Persistent storage 130 may be part of hardware node 110, or a separate node or collection of nodes located over network 170. In an example, reservation 190 is made in system resource allocation database 145 based on metadata 132 by orchestrator 140, reservation 190 including at least a size and a set of performance characteristics requested by and for isolated guest 160. Reservation 190 may also be made at orchestrator 140's request without being directly created by orchestrator 140, for example, by orchestrator 140 passing on the request to create isolated guest 160 along with pertinent information from metadata 132 to the system resource allocation database 145 or the persistent storage 130.

In an example, persistent storage 130 is requested to create persistent storage 135, and responds to the request with an indication that persistent storage 135 is granted, conditionally granted, or rejected based on information in metadata 132, for example, the size or performance characteristics requested for persistent storage 135. In an example, in addition to a requested size and requested performance characteristics for persistent storage 135, metadata 132 may also include alternative attributes for persistent storage 135, for example, a minimum size and/or a minimum set of performance characteristics. In an example, persistent storage 130 may conditionally grant persistent storage volume 135 if the requested size and/or requested performance characteristics are not met but the minimum size and minimum performance characteristics are met. Persistent storage 130 may determine whether to grant, conditionally grant, or reject the request to create persistent storage 135 by querying metadata 138, where metadata 138 may include information on the current allocations of persistent storage volumes belonging to persistent storage 130, including capacity information for size and performance characteristics. In an example, metadata 138 may be a persistent storage allocation database or metadata 138 may be the system resource allocation database 145 or part of the system resource allocation database 145.

In an example, in conjunction with granting or conditionally granting persistent storage volume 135, the persistent storage 130 queues the physical allocation of persistent storage volume 135 including the binding and/or formatting of persistent storage volume 135. In an example, the persistent storage 130 may update the system resource allocation database 145 or send a message to the orchestrator 140 to confirm that the persistent storage volume 135 is granted or conditionally granted, including in the confirmation, for example, size, performance characteristics, and access information for the persistent storage volume 135. Persistent storage volume 135 may also be conditionally granted based on minimum size and performance requirements in metadata 132, or an override by a user or administrator. In an example, after conditionally granting persistent storage volume 135 with a lesser size and/or performance characteristics than requested by metadata 132, the persistent storage 130 may, at a later time, increase the size and/or performance characteristics of persistent storage volume 135 to match the requested size and/or performance characteristics in metadata 132. The persistent storage 130 may also grant a separate persistent storage volume to make up for lacking size and/or performance characteristics in persistent storage volume 135. In an example, the size and performance characteristics of persistent storage volume 135 may be increased beyond the requested size and performance characteristics of persistent storage volume 135 upon user request. In another example, a user or administrator may override a rejection of the persistent storage volume, for example, by clearing space in the persistent storage or accepting less size and/or performance characteristics than the minimum requirements in the metadata 132. In the example, the user or administrator may also request an additional persistent storage volume to be allocated by the persistent storage 130 when such storage becomes available, or from another persistent storage to be mounted to isolated guest 160. In an example, persistent storage volume 135 may be allocated to isolated guest 160 after the request to create persistent storage volume 135 is granted or conditionally granted. In an example, persistent storage volume 135 may be allocated before persistent storage volume 135 is physically created, for example, by reserving or confirming a reservation for size and performance characteristics for persistent storage volume 135 in system resource allocation database 145.

The persistent storage volume is created based on the reservation of the persistent storage volume in the system resource allocation database (block 240). In an example, after the persistent storage 130 notifies the orchestrator 140 and/or updates the system resource allocation database 145 indicating that the persistent storage volume 135 is either granted or conditionally granted, the persistent storage 135 may begin the allocation process for the persistent storage volume 135. In an example, the persistent storage 130 may update the system resource allocation database with a first time-to-live timestamp indicating a point in time by which the persistent storage 130 may reclaim the persistent storage volume 135 if it has not been mounted by the isolated guest 160. The example persistent storage 130 may reclaim the persistent storage 135 at any time after the first time-to-live timestamp elapses. In another example, after the expiration of the first time-to-live timestamp but prior to the persistent storage volume 135 being reclaimed, the persistent storage volume 135 is mounted by the isolated guest 160. The persistent storage 130 and/or the orchestrator 140, may in some instances, provisionally reserve size or performance characteristics allocated to persistent storage volume 135 prior to reclaiming persistent storage 135, either before or after the expiration of the first time-to-live timestamp. In an example, the persistent storage volume 135 may not be reclaimed after being mounted. In another example, the persistent storage 135 may include in its notification to the orchestrator 140 or its update to the system resource allocation database 145 a second time-to-live timestamp predicting when the persistent storage volume 135 will be ready for use. In an example, the isolated guest 160 may wait until the second time-to-live timestamp has elapsed to attempt to access the persistent storage volume 135. In another example, the isolated guest 160 may attempt to access persistent storage volume 135 prior to the elapsing of the first time-to-live timestamp but may not issue an error for failing to mount the persistent storage volume 135 until after the second time-to-live timestamp has elapsed. In an example, an attempt by isolated guest 160 or auto-mounter plugin 142 to mount persistent storage volume 135 may be considered an attempt to access persistent storage volume 135 even if isolated guest 160 does not attempt to access persistent storage volume 135 to store or retrieve any data. In an example, the persistent storage volume 135 may be mounted to isolated guest 160 in response to isolated guest 160 attempting to access persistent storage volume 135 to store data, for example, the auto-mounter plugin 142 may mount the persistent storage volume 135 to isolated guest 160 in response to isolated guest 160 attempting to access persistent storage volume 135. In an example, the persistent storage 130's notification to the orchestrator 140 or update to the system resource allocation database 145 may include the granted size and performance characteristics of the persistent storage volume 135, and sufficient information for isolated guest 160 to mount persistent storage volume 135. The size, performance characteristics, and mounting information are accessed by, for example, the orchestrator 140, the isolated guest 160, and/or auto-mounter plugin 142.

The isolated guest is activated (block 250). In an example, the isolated guest 160 may be activated by the orchestrator 140 any time after the orchestrator 140 finishes construction of the isolated guest 160. In an example, the orchestrator 140 includes an auto-mounter plugin 142 in isolated guest 160 during the construction process. In some examples, the auto-mounter plugin 142 may be programmed by the orchestrator 140 with data required to access and mount persistent storage volume 135 received from persistent storage 130, or retrieved from system allocation database 145. In an example, auto-mounter plugin 142 may be derived from an auto master map. In other examples, the auto-mounter plugin 142 may be programmed to retrieve access and mounting data for persistent storage volume 135 from persistent storage 130, metadata 138, system resource allocation database 145, or some other source with the required information. In an example, the auto-mounter plugin may be launched by the orchestrator 140 at the time the isolated guest 160 is launched or at any time after the launch of isolated guest 160. In another example, the isolated guest 160 may be programmed to launch the auto-mounter plugin 142. After the auto-mounter plugin 142 is launched, the auto-mounter plugin 142 attempts to associate and mount the persistent storage volume 135 to the isolated guest 160. In some examples, the auto-mounter plugin 142 may obtain the necessary information to associate the persistent storage volume 135 with and/or mount the persistent storage volume 135 to isolated guest 160 prior to any other component of isolated guest 160 attempting to access the persistent storage volume 135. The auto-mounter plugin 142 may also mount the persistent storage volume 135 to isolated guest 160 prior to any other component of isolated guest 160 attempting to access the persistent storage volume 135, or the persistent storage volume 135 may be mounted to isolated guest 160 in response to a component of isolated guest 160 attempting to access the persistent storage volume 135. In another example, the auto-mounter plugin 142 may be a component external to isolated guest 160, such as a component of orchestrator 140 or a separate program.

In an example, the orchestrator 140 may activate the isolated guest 160 and/or auto-mounter plugin 142 before the persistent storage volume 135 is completely created by and/or in the persistent storage 130. In the example, the isolated guest 160 may reattempt to access persistent storage volume 135 and/or the auto-mounter plugin 142 may reattempt to mount the persistent storage volume 135 to isolated guest 160. In an example, the isolated guest 160 may be launched before the second time-to-live timestamp has elapsed and the auto-mounter plugin 142 or the isolated guest 160 may reattempt to access the persistent storage volume 135 until the second time-to-live timestamp indicating the expected time the persistent storage volume 135 has elapsed. In an example, the isolated guest 160 and/or the auto-mounter plugin 142 may issue an error in response to the second time-to-live timestamp elapsing without being able to mount the persistent storage volume 135. In an example, the auto-mounter plugin 142 and/or the isolated guest 160 may continue to repeatedly attempt to access persistent storage volume 135 and/or mount the persistent storage volume 135 after the second time-to-live timestamp has elapse or where there is no second time-to-live timestamp. In another example, the persistent storage volume 135 may be successfully created prior to the isolated guest 160 being launched. In the example, the metadata 138 and/or the system resource allocation database 145 may be updated with information from the prepared auto-mounter plugin 142, including information for accessing the persistent storage volume 135 and specifications of persistent storage volume 135, such as the size and performance characteristics of persistent storage volume 135. In an example, the persistent storage volume 135 may be formatted prior to being mounted by isolated guest 160, for example, in response to instructions from the orchestrator 140, the persistent storage 130 and/or instructions included in metadata 132. In another example, the persistent storage volume 135 may be formatted in response to instructions from the auto-mounter plugin 142 or the isolated guest 160, for example, when the persistent storage volume 135 is mounted to isolated guest 160.

The persistent storage volume is then accessed (block 260). In an example, persistent storage volume 135 may be accessed by isolated guest 160 once persistent storage volume 135 is successfully mounted to isolated guest 160 either directly by the isolated guest 160 or via auto-mounter plugin 142. In an example, the persistent storage volume 135 may be associated and/or mounted to the isolated guest 160 in response to the isolated guest 160 being activated or the isolated guest performing an attempt to access the persistent storage volume 135 In an example, the metadata 138 and/or the system resource allocation database 145 are updated after the successful mounting of the persistent storage volume 135 to the isolated guest 160 with information attributing the persistent storage volume 135 to the isolated guest 160. In an example, metadata 138 and/or the system resource allocation database 145 may use the attribution information between persistent storage volume 135 and isolated guest 160 in determining the availability of persistent storage space for future isolated guest requests or other requests for storage.

In some examples, the persistent storage 130 may reject the request from the orchestrator 140 to create persistent storage volume 135. The rejection may be based on analysis of capacity for size and performance characteristics by the persistent storage 130, in some cases by analyzing metadata 138 and/or the system resource allocation database. In an example, the orchestrator 140 may attempt to request storage from a different persistent storage, or allow the user to intervene to override the rejection. The persistent storage chosen by the orchestrator 140 to host persistent storage volume 135 may be selected on a variety of criteria including, in some examples, performance criteria such as latency and bandwidth. The orchestrator 140 may have a hierarchy from which to select a preferential persistent storage to host persistent storage volume 135. In some examples, the hierarchy may be influenced by the requested performance characteristics from metadata 132.

In an example, the orchestrator 140 and/or the persistent storage 130 may also act as gatekeepers by prioritizing requests for persistent storage. In an example, the orchestrator 140 and/or persistent storage 130 may reject a request for creating a persistent storage volume based on the identity of the requestor. For example, in some systems only requestors on an allowed "white list" may request persistent storage volumes from persistent storage 130, or certain known bad actors may be "black listed" to prevent them from requesting persistent storage volumes from persistent storage 130. In some examples, requests for creating isolated guests or persistent storage volumes may be associated with a time to fulfill indicating the urgency of the request, and the persistent storage 130 and/or the orchestrator 140 may use such an indication of urgency to prioritize a request for a persistent storage volume. The persistent storage 130 and/or the orchestrator 140 may also use the size of the persistent storage volume requested, the performance characteristics of the persistent storage volume requested and/or the identity of the requestor to prioritize a request. In an example, a bad actor may attempt a denial of service attack against a system by triggering many requests for persistent storage volumes, for example, through requesting many isolated guests to be created, and the persistent storage 130 and/or the orchestrator 140 may block these requests.

In another example, certain isolated guests may be deemed to deliver core functionality, and allocation of persistent storage volumes to these isolated guests may take precedence over requests by other isolated guests. In an example, the persistent storage 130 may delay or rescind the granting of a persistent storage volume to an isolated guest in favor of another higher priority isolated guest. In this example, persistent storage 130 may seamlessly reallocate storage resources prior to a persistent storage volume being mounted by an isolated guest by replacing diverted size or performance characteristics with newly freed up size or performance characteristics prior to a persistent storage volume being mounted to an isolated guest. In an example, the orchestrator 140 and/or the persistent storage 130 may also delay the creation of a persistent storage volume or an isolated guest in favor of diverting reserved or allocated size and or performance characteristics for the persistent storage volume of the isolated guest to a higher priority isolated guest. In an example, isolated guest 160 may reserve a certain size and performance characteristics for persistent storage volume 135, but some or all of the size and performance characteristics may be used to first launch a higher priority persistent storage volume or isolated guest. In the example, persistent storage 130 and/or orchestrator 140 may reduce the granted reservation for size and/or performance characteristics for persistent storage volume 135 to the minimum requirements set in metadata 132 without consultation. In an example, user confirmation may be required to reduce the size or performance characteristics under the minimum requirements set in metadata 132, or a request of sufficiently high priority may override such confirmation. In an example, the persistent storage 130 may fail to create the persistent storage volume 135 before the isolated guest 160 requires the persistent storage volume 135. Upon discovering a failure by the persistent storage 130 to provision persistent storage volume 135, the isolated guest 160 may request an alternative persistent storage volume from and alternative persistent storage, and/or deliver an error.

Figure 3A:
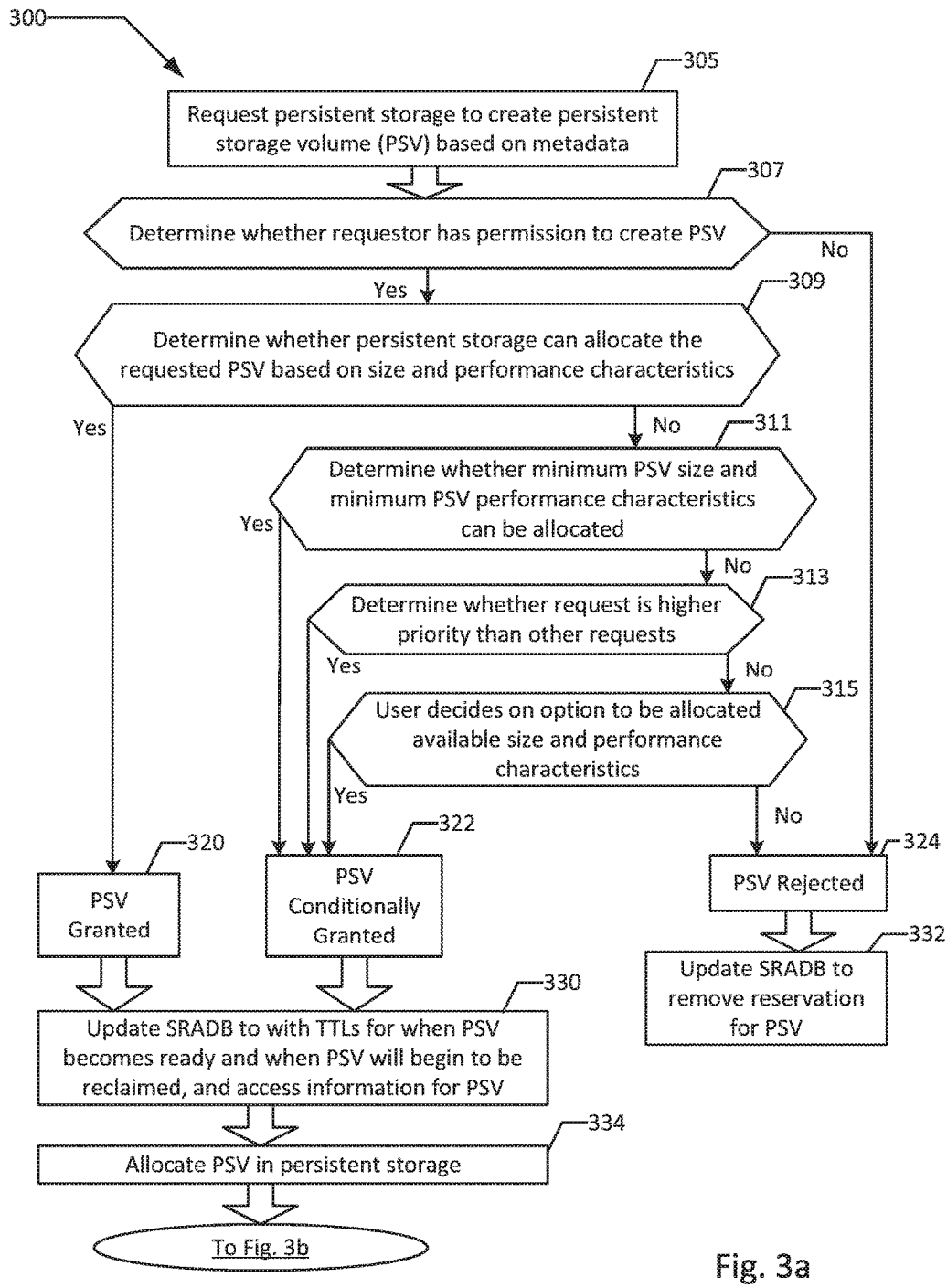
FIG. 3a and FIG. 3b are a flowchart illustrating an example embodiment of provisioning a persistent storage volume according to an example of the present disclosure.
Figure 3B:
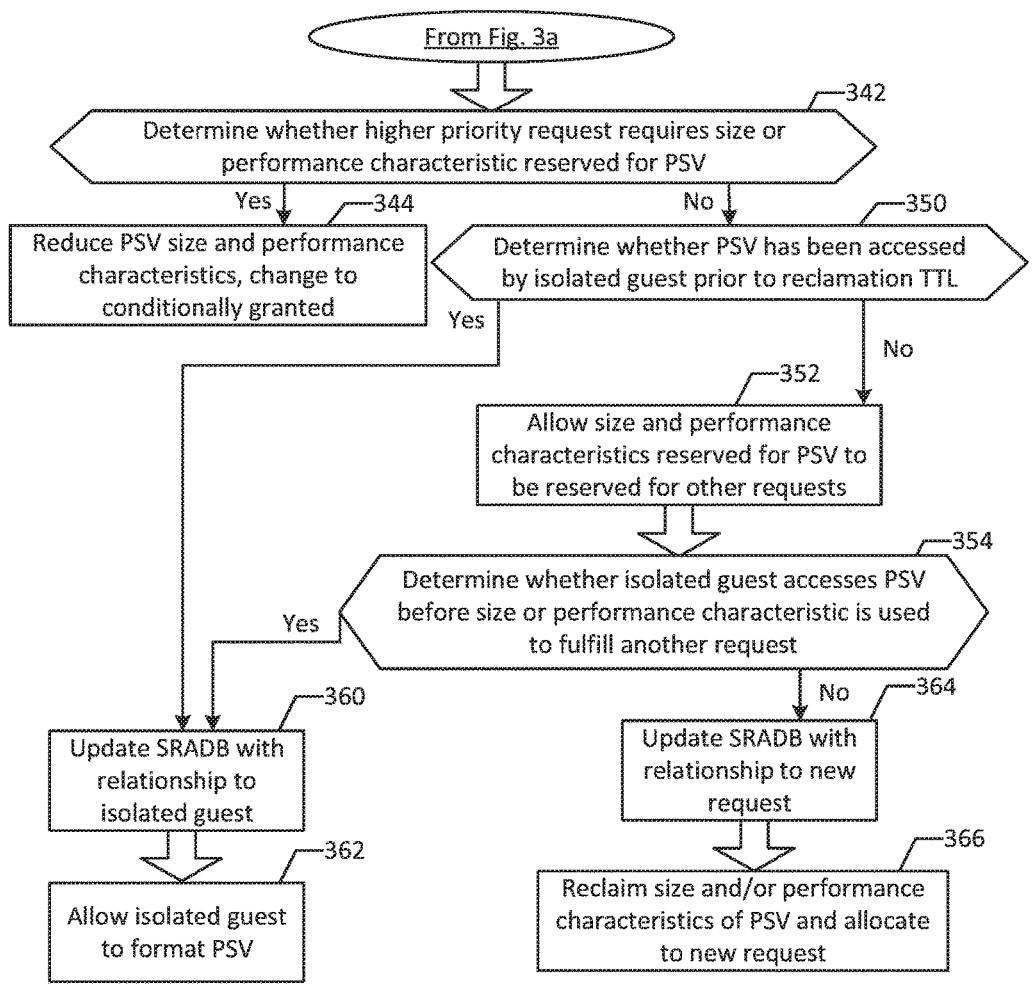

FIGS. 3a and 3b illustrate a flowchart of an example embodiment of provisioning a persistent storage volume according to an example of the present disclosure. Although the examples below are described with reference to the flowchart illustrated in FIG. 3a and FIG. 3b it will be appreciated that many other methods of performing the acts associated with FIG. 3a and FIG. 3b may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the example method 300, persistent storage 130 may be requested to create persistent storage volume 135 based on metadata 132 (block 305). The persistent storage 130 will determine whether the requestor of persistent storage volume 135 has the required permissions to request a persistent storage volume (block 307). If the requestor does not have proper permissions, the request for a persistent storage volume may be rejected (block 324). The system resource allocation database 145 may also be updated to remove the reservation 190 for persistent storage volume 135 (block 332). Alternatively, if the requestor does have proper permissions to request persistent storage volumes, the persistent storage 130 may determine whether the persistent storage 130 may be allocated to the requested persistent storage volume 135 based on the requested size and performance characteristics (block 309). In an example, the persistent storage 130 may make this decision based on querying metadata 138 and/or system resource allocation database 145. If the requested size and performance characteristics are available, the persistent storage 130 may grant the persistent storage volume (block 320). If the persistent storage 130 determines that it is incapable of granting the requested size and performance characteristics for persistent storage volume 135, the persistent storage 130 may determine whether a minimum required size and minimum performance characteristics for persistent storage volume 135 may be allocated (block 311). In an example, the minimum size and performance characteristics may be allocated and the persistent storage volume 135 is conditionally granted (block 322). Alternatively, if there is insufficient capacity to allocate the minimum size and/or minimum performance characteristics, the persistent storage may determine whether the current request for persistent storage volume 135 is higher priority than other queued and pending requests for persistent storage volumes that have not yet been mounted (block 313). In an example, the persistent storage 130 may compare the priority of the request for persistent storage volume 135 with requests for persistent storage volumes unrelated to isolated guests. If the request for persistent storage volume 135 is sufficiently high priority, the request may be conditionally granted (block 322). In an example, if the request is of extraordinary priority the full requested size and performance characteristics may be diverted to grant persistent storage volume 135. In an example, the request for creating persistent storage volume 135 may carry an enhanced priority and the persistent storage 130 may grant the request to create persistent storage volume 135 by deprioritizing another request, for example, by allocating size or performance characteristics reserved for another request to the persistent storage volume 135. In an example, where the request to create persistent storage volume 135 is not higher priority than other requests, a user may be prompted to decide on whether currently available sizes and performance characteristics would be acceptable for persistent storage volume 135 (block 315). If the user accepts the available size and performance characteristics, the persistent storage volume 135 is conditionally granted (block 322). If the user rejects the available size and performance characteristics, the request for the persistent storage volume 135 is rejected (block 324).

In response to the persistent storage 130 either granting or conditionally granting the persistent storage volume 135, the system resource allocation database may be updated with time-to-live timestamps indicating when persistent storage volume 135 should be ready to be mounted and also when the persistent storage 130 may begin reclaiming persistent storage volume 135, and also access information for the persistent storage volume 135 (block 330). In an example, the persistent storage 130 may reclaim the persistent storage volume 135 if the isolated guest 160 does not access and/or mount the persistent storage volume 135 prior to the expiration of the time-to-live timestamp for reclaiming persistent storage volume 135. In an example, the system resource allocation database 145 may be updated with information on how to access the persistent storage volume 135, and the information may be used by the auto-mounter plugin 142 to mount the persistent storage volume to isolated guest 160, or the information may be used by isolated guest 160 to attempt to access the persistent storage volume 135. The persistent storage 130 may then allocate the persistent storage volume 135 (block 334). The example method 300 shown in FIG. 3a continues on FIG. 3b.

In an example, during the allocation process for persistent storage volume 135, persistent storage 130 may determine whether a higher priority request exists or has been received that requires part of the size or performance characteristics reserved for persistent storage volume 135 (block 342). If such a request exists, persistent storage 130 may reduce any granted size and/or performance characteristics for persistent storage volume 135, and if necessary, change persistent storage volume 135 to conditionally granted from granted (block 344). If no higher priority request exists, the persistent storage 130 may wait and determine if the persistent storage volume 135 has been accessed by the isolated guest 160 prior to the first time-to-live timestamp elapsing indicating that the persistent storage volume 135 may be reclaimed (block 350). In an example, persistent storage 130 may determine that persistent storage volume 135 has been successfully accessed by isolated guest 160 if persistent storage volume 135 has been mounted to isolated guest 160 by isolated guest 160 or the auto-mounter plugin 142, even if isolated guest 160 has not attempted to access persistent storage volume 135 to store or retrieve any data. If the persistent storage volume 135 has been accessed and/or mounted by the isolated guest 160, the system resource allocation database 145 may be updated by the persistent storage 130, the auto-mounter plugin 142, the isolated guest 160, and/or the orchestrator 140 to indicate the relationship between the isolated guest 160 and the persistent storage volume 135 (block 360). In an example, if the persistent storage volume 135 had not yet been formatted during the creation process, the isolated guest 160 may be allowed to format the persistent storage volume 135 after successfully mounting the persistent storage volume 135 and updating the system resource allocation database 145 (block 362).

If the first time-to-live timestamp indicating that the persistent storage 130 may reclaim persistent storage volume 135 expires prior to the isolated guest 160 accessing the persistent storage volume 135, the persistent storage 130 may allow the size and performance characteristics reserved for and/or allocated to persistent storage volume 135 to be reserved for other requests (block 352). Access could be mounting without accessing to store data The persistent storage 130 may then wait to determine whether the isolated guest accesses and/or mounts the persistent storage volume 135 prior to the size and/or performance characteristics allocated to the persistent storage volume 135 being reclaimed and used to fulfill another request (block 354). If the isolated guest 160 mounts the persistent storage volume 135 first, the system resource allocation database 145 may be updated with the relationship between the isolated guest 160 and the persistent storage volume 135 (block 360). If the size and/or performance characteristics of the persistent storage volume 135 are requested for a new persistent storage volume prior to the persistent storage volume 135 being accessed and/or mounted by the isolated guest 160, the system resource allocation database 145 may be updated to show the new relationship between the reclaimed size and performance characteristics with the newly requested persistent storage volume (block 364). The persistent storage 130 may then either simultaneously or subsequently reclaim the size and/or performance characteristics of persistent storage volume 135 to fulfill the new request (block 366).

Figure 4:
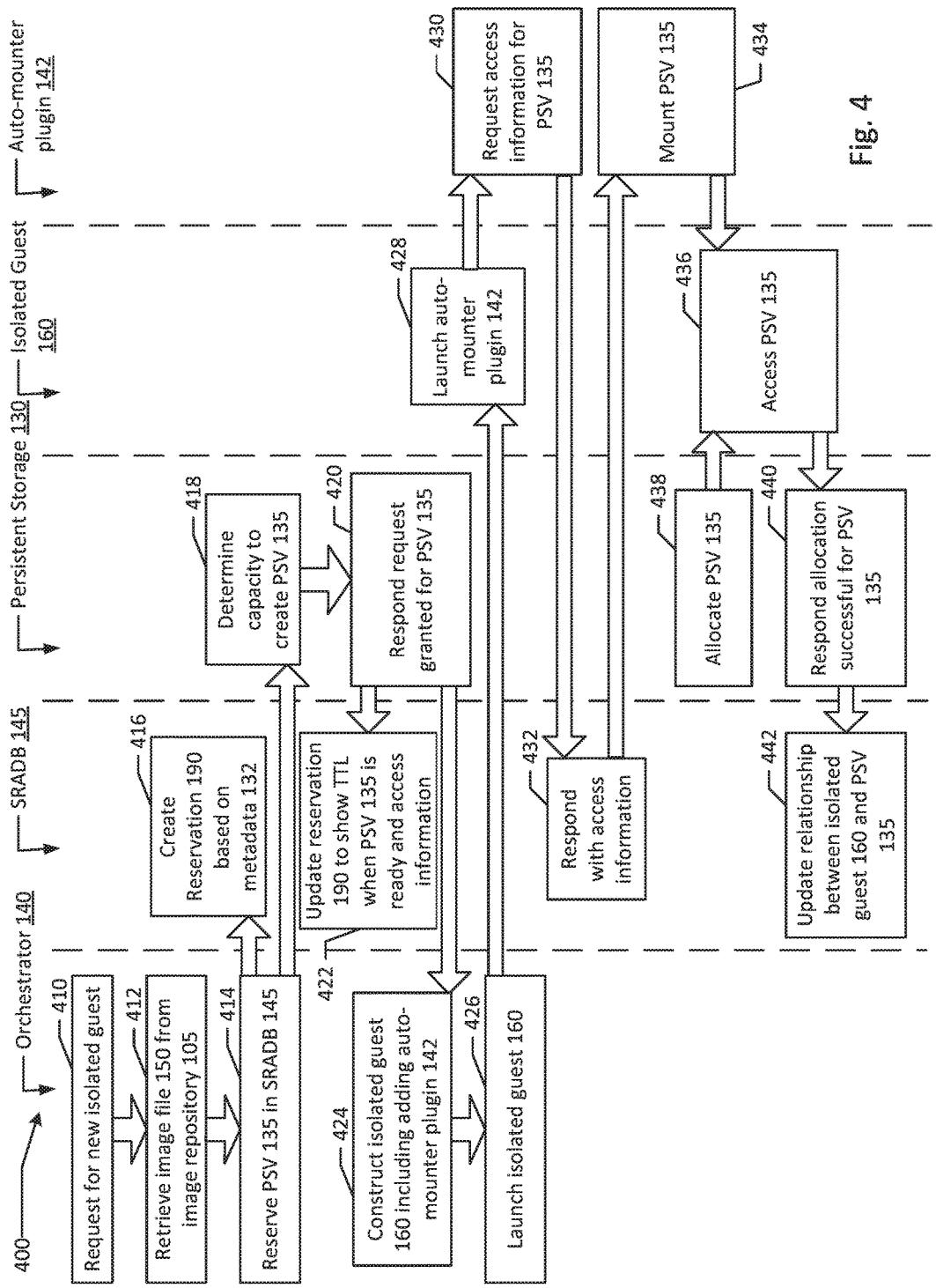
FIG. 4 is a flow diagram illustrating example tasks performed by different parts of a system provisioning a persistent storage volume according to an example of the present disclosure.

FIG. 4 depicts a flow diagram illustrating example tasks performed by different parts of a system provisioning a persistent storage volume according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, the orchestrator 140 is in communication with system resource allocation database 145, persistent storage 130, isolated guest 160, and auto-mounter plugin 142.

In an example, the orchestrator 140 receives a request to create a new isolated guest (block 410). In response to the request, the orchestrator 140 retrieves image file 150 from image repository 105 (block 412). In an example, metadata 132 or data from metadata 132 may also be retrieved along with the image file 150 from image repository 105. In another example, metadata 132 may be retrieved before or after image file 150, from either image repository 105 or another repository. The orchestrator then reserves persistent storage volume 135 in the system resource allocation database 145 (block 414). Reservation 190 is created in system resource allocation database 145 based on metadata 132 (block 416). In an example, the orchestrator 140 may prompt the persistent storage 130 to determine whether persistent storage 130 has sufficient capacity to create persistent storage volume 135 (block 418). In some examples, persistent storage 130 may query the system resource allocation database 145 to determine the required size and performance characteristics of persistent storage volume 135, or the persistent storage 130 may receive the required size and performance characteristics of persistent storage volume 135 from orchestrator 140. The persistent storage 130 may then respond that the request for persistent storage volume 135 is granted (block 420). After granting the request for persistent storage volume 135, persistent storage 130 may update the reservation 190 to show a time-to-live timestamp for when persistent storage volume 135 will be ready to be mounted, including access information for the persistent storage volume 135 (block 422). In an example, the orchestrator 140 may await a response that persistent storage volume 135 will be granted before constructing isolated guest 160 from image file 150. In the example, orchestrator may construct the isolated guest 160 and add an auto-mounter plugin 142 to isolated guest 160 (block 424).

Upon finishing construction of the isolated guest 160, the orchestrator 140 may launch the isolated guest 160 (block 426). Upon launch of the isolated guest 160, the isolated guest 160 may launch the auto-mounter plugin 142 (block 428). In an example, upon launch, the auto-mounter plugin 142 may request the system resource allocation database 145 for information included in reservation 190 concerning access and mounting information for persistent storage volume 135 (block 430). The system resource allocation database 145 may respond to the auto-mounter plugin 142 with the requested access information (block 432). The auto-mounter plugin 142 may use the access information to mount the persistent storage volume 135 to isolated guest 160 (block 434). After the mounting of persistent storage volume 135, the isolated guest 160 may attempt to access persistent storage volume 135 (block 436). Accessing persistent storage volume 135 is possible once persistent storage 130 has successfully finished creating persistent storage volume 135 (block 438). Persistent storage 130 may respond to a successful access of persistent storage volume 135 by isolated guest 160 by indicating that persistent storage volume 135 was successfully allocated to isolated guest 160 (block 440). In an example, persistent storage 130 may update system resource allocation database 145 to show the updated relationship between isolated guest 160 and persistent storage volume 135 (block 442). In each case, where possible, a metadata based determination of capacity and availability may be utilized to generate an acknowledgement and/or response to the request for persistent storage volume 135, while physical allocation processes occur in the background after the acknowledgements based on reservation 190 have been sent to the next downstream component.

Figure 5:
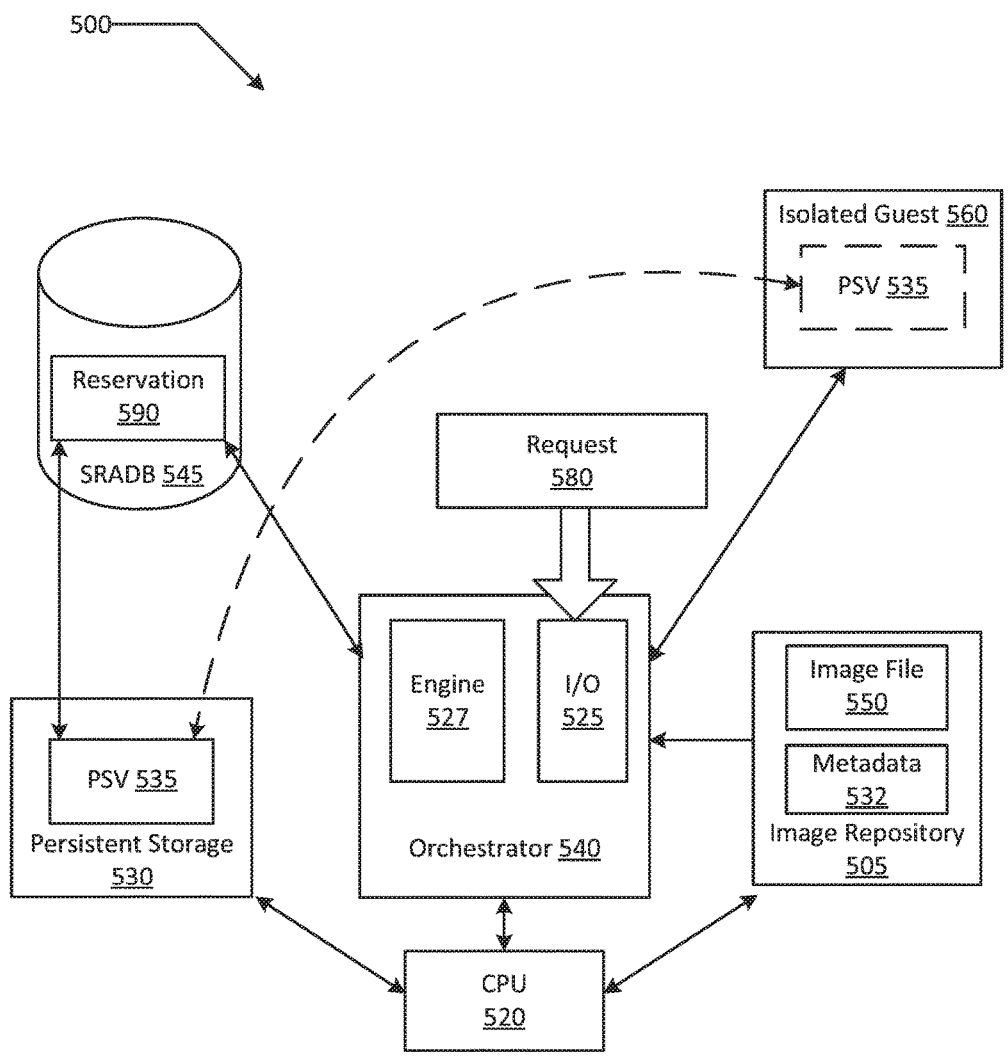
FIG. 5 is a block diagram of an example persistent storage volume provisioning system according to an example of the present disclosure.

FIG. 5 depicts a block diagram of an example persistent storage volume provisioning system according to an example of the present disclosure. Example system 500 comprises a processor 520 in communication with an image repository 505 and a persistent storage 530. In an example, image repository 505 and persistent storage 530 may be located on the same physical hardware node as processor 520 or separated by a network. Processor 520, image repository 505, and persistent storage 530 may also represent numerous physical devices networked together to perform the functions of processor 520, image repository 505 and persistent storage 530. An orchestrator 540 comprising an I/O 525 and an orchestrator engine 527 execute on the processor 520. The I/O 525 receives a first request 580 to create an isolated guest 560 associated with a persistent storage volume 535. The isolated guest 560 is created according to image file 550 in the image repository 505, and the image file 550 is associated with metadata 532.

The orchestrator 540 obtains the image file 550 and the metadata 532 from the image repository 505. The orchestrator 540 reserves the persistent storage volume 535 by updating a system resource allocation database 545 with a reservation 590 based on metadata 532. The persistent storage volume 535 is created in persistent storage 530 based on reservation 590 in system resource allocation database 545. The orchestrator 540 activates isolated guest 560. The isolated guest 560 accesses the persistent storage volume 535.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of launching containers separating persistent storage allocation from container construction, the method comprising:
   receiving a first request to launch a container to operate as an isolated guest, wherein the container is launched according to an image file, which is associated with metadata about the image file;
   obtaining the image file and the metadata associated with the image file from an image repository;
   reserving a persistent storage volume for the container by updating a system resource allocation database with a reservation based on the metadata;
   responsive to receiving the reservation of the persistent storage volume:
      constructing the container;
      creating the persistent storage volume based on the reservation;
      activating the container; and
      accessing the persistent storage volume by the container.

2. The method of claim 1, wherein the container is initialized substantially simultaneously with the creation of the persistent storage volume based on the reservation.

3. The method of claim 2, wherein the container is activated after the container is constructed and after the persistent storage volume is created based on the reservation.

4. The method of claim 1, wherein the container begins being constructed while the persistent storage volume is being created based on the reservation.

5. The method of claim 1, wherein the persistent storage volume begins being created based on the reservation while the container is being constructed.

6. The method of claim 1, wherein a second request to the persistent storage to reserve the persistent storage volume in the persistent storage results in a response indicating that the persistent storage volume is one of granted, conditionally granted, and rejected based on the metadata, wherein the metadata includes a size and performance characteristics requested of the persistent storage volume.

7. The method of claim 6, wherein the metadata includes at least one of a minimum size and a minimum performance characteristic of the persistent storage volume to be conditionally granted.

8. The method of claim 6, wherein the second request to reserve the persistent storage volume is conditionally granted with at least one of a lesser size and lower performance characteristics than the size and performance characteristics requested of the persistent storage volume based on at least one of information in the second request, information in the metadata, and a confirmation by a user.

9. The method of claim 8, wherein, at a first time, the persistent storage volume has an allocated size and allocated performance characteristics, at least one of the allocated size and the allocated performance characteristics being less than the size and the performance characteristics requested of the persistent storage volume, and at a second time after the first time, the persistent storage increases at least one of the allocated size and the allocated performance characteristics to match at least one of the size and the performance characteristics requested of the persistent storage volume.

10. The method of claim 6, wherein responsive to indicating that the persistent storage volume is at least one of granted and conditionally granted, the persistent storage updates the system resource allocation database with information enabling the container to access the persistent storage volume, and
at least one of an orchestrator, the container, and an auto-mounter plugin accesses the information.

11. The method of claim 1, wherein the system resource allocation database is updated with a first time-to-live timestamp indicating a first time by which the persistent storage volume must be accessed before the reservation of the persistent storage volume is lost, and the persistent storage volume is reclaimed after the first time-to-live timestamp elapses.

12. The method of claim 1, wherein the persistent storage receives a plurality of requests to create persistent storage volumes, and the plurality of requests are prioritized based on at least one of an identity of a requestor of a respective request, a requested time to fulfill the respective request, a size of the respective request, and performance characteristics of the respective request.

13. The method of claim 12, wherein a second request is rejected based on the identity of the requestor.

14. The method of claim 13, wherein the system resource allocation database is updated with a relationship between the container and the persistent storage volume.

15. The method of claim 1, wherein an auto-mounter plugin is associated with the container and the auto-mounter plugin obtains information necessary to associate the persistent storage volume to the container prior to the container accessing the persistent storage volume.

16. The method of claim 15, wherein the auto-mounter plugin is launched by at least one of an orchestrator and the container, and the auto-mounter plugin associates the container to the persistent storage volume.

17. The method of claim 1, wherein an orchestrator activates the container prior to the completion of the creation of the persistent storage volume in the persistent storage.

18. The method of claim 1, wherein the persistent storage volume is associated with the container responsive to at least one of the isolated guest being activated and the container performing an initial access attempt to access the persistent storage volume.

19. A system of launching containers separating persistent storage allocation from container construction, the system comprising:
an image repository;
a persistent storage;
one or more processors, in communication with the image repository and the persistent storage;
a system resource allocation database;
an orchestrator, executing on the one or more processors, including:
an input/output module; and
an orchestrator engine,
wherein the one or more processors:
receive, from the input/output module, a request to launch a container to operate as an isolated guest, wherein the container is launched according to an image file, which is associated with metadata about the image file;
obtain, by the orchestrator, the image file and the metadata associated with the image file from an image repository;
reserve, by the orchestrator, a persistent storage volume for the container by updating a system resource allocation database with a reservation based on the metadata;
responsive to receiving the reservation of the persistent storage volume:
construct, by the orchestrator, the container;
create, in the persistent storage, the persistent storage volume based on the reservation;
activate, by the orchestrator, the container; and
access, by the isolated guest, the persistent storage volume by the container.

20. A computer-readable non-transitory storage medium storing executable instructions of launching containers separating persistent storage allocation from container construction, which when executed by a computer system, cause the computer system to:
receive a request to launch a container to operate as an isolated guest, wherein the container is launched according to an image file, which is associated with metadata about the image file;
obtain the image file and the metadata associated with the image file from an image repository;
reserve a persistent storage volume for the container by updating a system resource allocation database with a reservation based on the metadata;

responsive to receiving the reservation of the persistent storage volume:
construct the container;
create the persistent storage volume based on the reservation;
activate the container; and
access the persistent storage volume by the container.

* * * * *